March 8, 1966     Y. DESMARCHELIER     3,238,850

JACKS WITH DAMPING MEANS

Filed Oct. 8, 1963     3 Sheets-Sheet 1

INVENTOR
Yves Desmarchelier

By Paul M. Craig, Jr.
ATTORNEY

March 8, 1966  Y. DESMARCHELIER  3,238,850
JACKS WITH DAMPING MEANS
Filed Oct. 8, 1963  3 Sheets-Sheet 3

INVENTOR
Yves Desmarchelier
By Paul M. Craig Jr.
ATTORNEY

United States Patent Office 3,238,850
Patented Mar. 8, 1966

3,238,850
JACKS WITH DAMPING MEANS
Yves Desmarchelier, Nanterre, France, assignor to Compagnie Parisienne d'Outillage a Air Comprime, Paris, France
Filed Oct. 8, 1963, Ser. No. 314,715
Claims priority, application France, Oct. 13, 1962, 912,193
1 Claim. (Cl. 91—394)

Hitherto known hydraulic or pneumatic jacks frequently comprise a damping device which is intended to decelerate the movement of the moving part at the end of travel. These devices can be externally of the jacks, such as for example the counter-jacks, or internally of the jacks, such devices being either mechanical, pneumatic or hydraulic.

Known internal damping devices of pneumatic and hydraulic types consist essentially in creating on the face of the moving part which is not subjected to driving pressure, a counter-pressure intended to oppose the driving force and to decelerate the moving masses. In pneumatic jacks, this counter-pressure is created by the compression of the air in a damping chamber. This damping effect can be made regulatable by variation of the flow of a permanent leakage establishing communication between the damping chamber and the discharge.

However, this device has many disadvantages due particularly to the presence of the permanent leakage. In fact, the flow of the latter must be sufficiently small to permit subjecting the air in the damping chamber to increasing pressure without making the value of the counter-pressure such that it causes a rebound at the end of travel of the mobile part. The optimum value of flow for this permanent leakage, when it can be found, requires very fine adjustment. On the other hand, the value of this flow depends essentially on the law of the movement of the mobile part and is directly dependent on the moving masses and also the driving pressure. Therefore, it will be seen that regulation is not only tricky but very unstable since it must be effected again for each different value of the loads applied to the jack.

It should also be noted that if the damping effect requires a small value for the permanent leakage flow, this results in a considerable counter-pressure producing considerable heating which results more particularly in rapid damage to the sealing elements.

The present invention makes it possible to overcome these disadvantages. It relates to a single-acting or double-acting jack comprising any number of cells, whose moving parts are adapted to be displaced within closed compartments under the action of a fluid under pressure, and comprising means for creating a damping counter-pressure on the faces of the mobile part not subjected to the working pressure, the mobile part itself creating the necessary counter-pressure for damping, and characterised in that the jack is provided with an outlet valve operating at a pre-determined value of this counter-pressure. The damping device thus obtained is not only independent of the law of the movement of the mobile part but also independent of the moving masses and more particularly the loads applied to the jack.

A preferred form of embodiment of the invention will now be described, merely by way of example and in no limitative sense, with reference to the accompanying drawings.

The following description relates to a pneumatic double-acting jack whose moving part is a piston slidable in a cylinder. Of course, the present invention is applicable to any jack of single-acting or double-acting type, single-cylinder or multi-cellular, hydraulic or pneumatic, and the moving part may be the cylinder or the piston.

Figure 1:
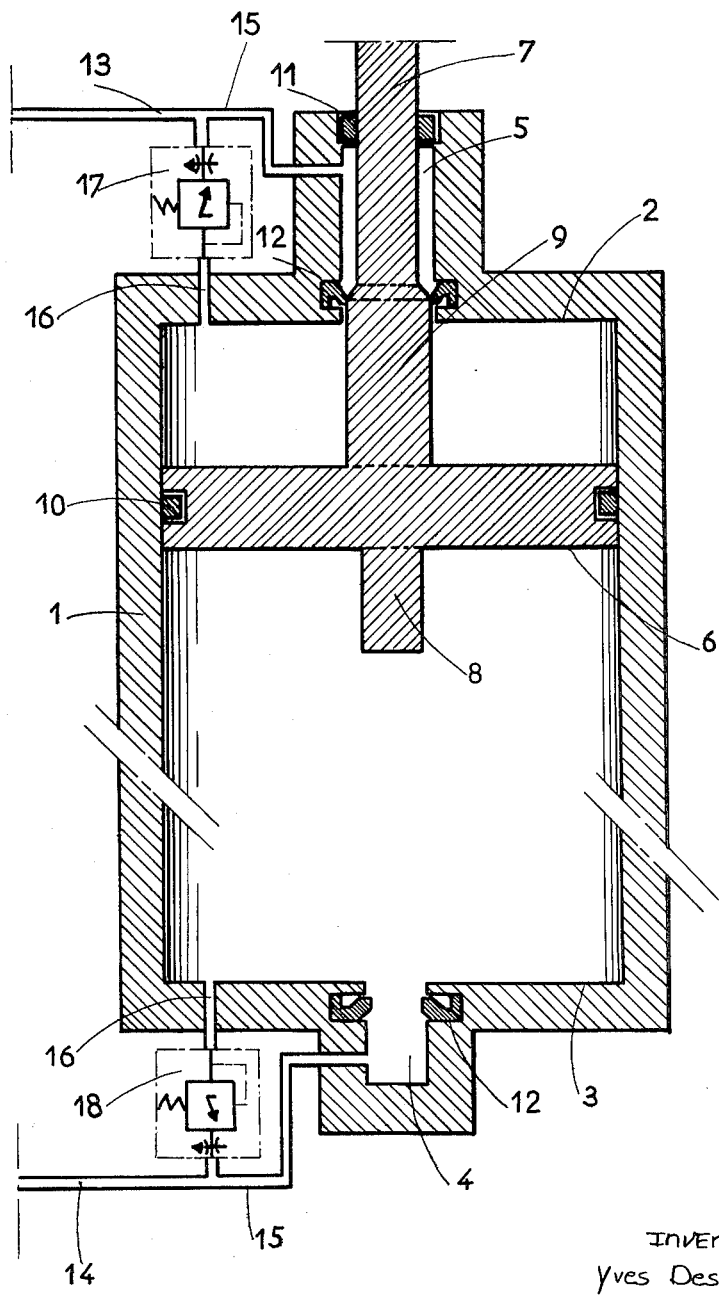
FIGURE 1 shows a diagrammatic view in axial section through a double-acting pneumatic jack.

The jack comprises:
A cylinder 1 whose ends 2, 3 each comprise an axial cavity 4, 5.

A piston 6 fast with a rod 7. The face of the piston opposite to that to which the rod 7 is attached comprises a cylindrical portion 8 which is co-axial and whose diameter and length are slightly less than those of the cavity 4. The piston rod 7 comprises in the vicinity of the piston a cylindrical portion 9 whose diameter and length are slightly less than those of the cavity 5.

A sealing element 10 situated in a groove of the piston, providing sealing-tightness between the piston and the cylinder.

A sealing element 11 situated at the end of the cavity 5 effecting sealing-tightness between the rod 7 of the piston 6 and the outside.

Special sealing elements 12 situated respectively at the entrances of the cavities 4, 5 debouching into the cylinder, the form of these elements being such that their lips open in the "working" sense and provide sealing-tightness between the cylinder and the said cavities in the "damping" sense. The terms "working sense" and "damping sense" will be defined hereinafter.

Ducts 13, 14 intended for supplying and discharging fluid under pressure which are connected to a distributor not shown here and each comprise two branch ducts 15, 16. The ducts 15 each debouch into the cavities 4, 5. The ducts 16 each debouch into the cylinder ends 2, 3 by means of spring-loaded valves represented diagrammatically at 17, and 18.

Figure 2:
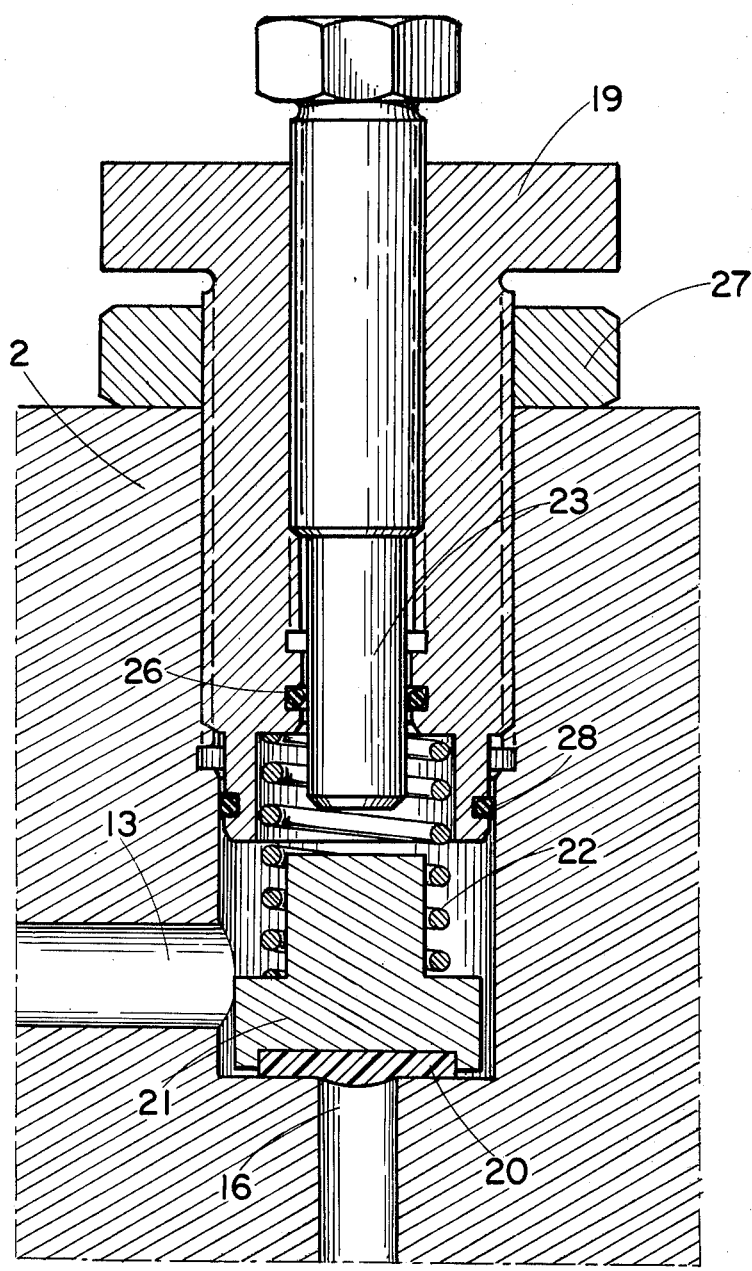
FIGURE 2 is an axial sectional view of a spring-loaded valve.

These spring-loaded valves are shown in detail in FIGURE 2 and comprise:

A body 19 screwed into the jack ends 3, 4 and which is locked by the lock-nut 27.

A closure member 21 held in closed position by a spring 22 the axial displacement of which is limited by an abutment 23 screwed into the body 19 and comprising a sealing element 20.

Sealing elements 26, 28 ensure sealing-tightness of the inner chamber of the valves.

Figure 3:
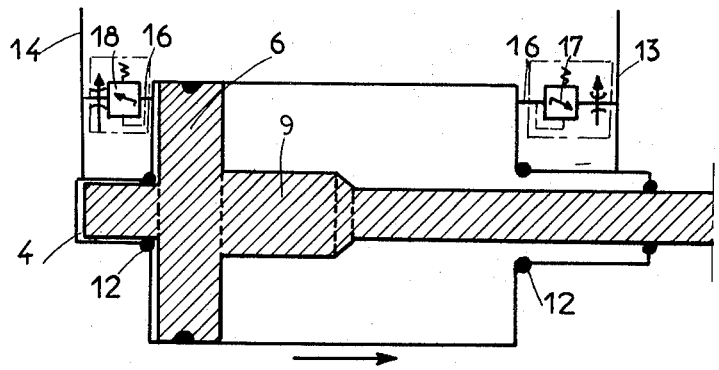
FIGURES 3, 4 and 5 show three different positions of the piston during a jack cycle.
Figure 4:
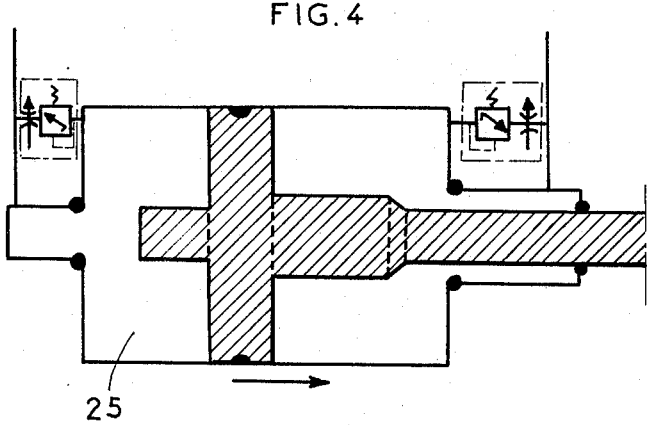
Figure 5:
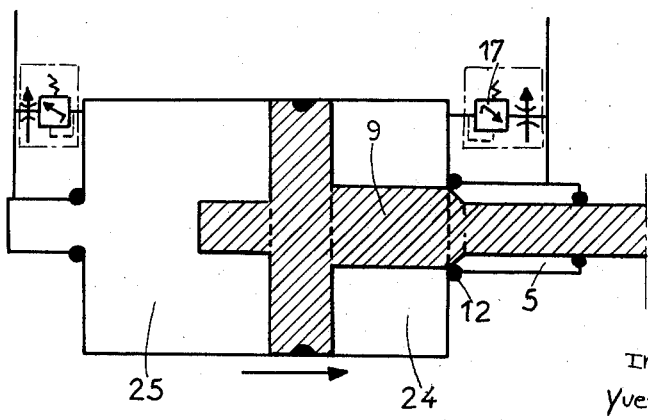

The invention will be better understood by considering a jack cycle, whose different phases are shown in FIGURES 3, 4 and 5.

When the piston is in the condition of rest, with the rod withdrawn, a distributor not shown here sends compressed air into the duct 14.

The compressed air entering the cavity 4 and the lips of the sealing element 12 descending, the pressure is exerted over the entire surface of the piston, which slides with a uniformly accelerated axial movement in the cylinder as illustrated in FIGURE 4.

The damping of the piston movement commences when the cylindrical portion 9 penetrates into the cavity 5, this damping being effected in two phases:

(1) A phase of compression in an enclosed space wherein the air contained in the space bounded by the face of the piston which is not subjected to driving pressure and the cylinder end 2 cannot escape. This space 24 is called the damping chamber in contrast to the space 25 which is called the working chamber. The damping chamber is sealed on the one hand by the sealing element 12 whose lips bear against the cylindrical portion 9 under the action of the increasing pressure in the chamber 24, and by the valve 18 on the other hand. The spring 22 maintaining the closure member 21 of the valve 18 is calibrated in such a manner that the opening of the valve connecting the chamber 24 with the atmosphere is effected at a specific value of the pressure prevailing in the damping chamber. This value is such that it effects the dynamic equalisation of the driving pressure force and the damping force, thus annulling the acceleration of the piston and consequently all the moving masses.

The advantage of compression in an enclosed space as has just been described in contrast to damping obtained by a regulatable permanent leakage, is that it makes it possible to obtain rapidly a value of damping counter-pressure which brings about dynamic equilibrium. At the end of this phase, the acceleration of the piston is nil.

It should be noted that in this phase of movement, the regulation for a given jack depends only on the value of the feed pressure, and is independent of the movement of the mobile member and of the loads which are applied thereto.

(2) A phase of deceleration during which the pressure prevailing in the damping chamber increases further, thus braking the moving masses. The air contained in the damping chamber is connected with the atmosphere by way of the valve 18. The outlet flow is regulatable. Regulation is effected by the abutment 23 screwed into the body 12 of the valve, which limits the axial displacement of the closure member 21.

The foregoing description shows the operation of a jack according to the invention from the "withdrawn rod" position. It will be apparent that the method of operation is the same when the starting position is the "rod out" position.

Of course, many modifications could be made to the form of embodiment which is given here purely by way of example, without departing from the scope of the present invention.

I claim:

A double-acting jack comprising a cylinder, a piston slidable in said cylinder and with opposite end portions of said cylinder defining chambers within said cylinder, cylindrical portions respectively integral with opposite faces of said piston and coaxial therewith, said opposite end portions of said cylinder comprising means defining cylindrical cavities communicating respectively with said chambers, said cylindrical portions being coaxial with said cylindrical cavities, each of said cylindrical cavities being adapted to receive therein a respective one of said cylindrical portions, two ducts for the supply and discharge of fluid under pressure, a first pair of fluid passage means communicating with one of said ducts, a second pair of fluid passage means communicating with the other of said ducts, one of the fluid passage means comprised in said first pair and in said second pair comprising valve means controlling the venting to the air of each said one of said fluid passage means, each said one of said fluid passage means terminating in a respective one of said chambers, the other of said fluid passage means comprised in said first pair and in said second pair terminating in a respective one of said cylindrical cavities, each said valve means comprising an axially displaceable closure member, abutment means for controlling the axial displacement of said closure member, spring means urging said closure member into a position closing a respective one of said fluid passage means, one of said chambers receiving fluid under pressure from one of said cylindrical cavities and causing an axial movement of said piston effective to cause an increased fluid pressure in the other of said chambers, said spring means being so calibrated that opening of said closure member takes place in response to a predetermined value of said increased fluid pressure in said other of said chambers, said value being slightly lower than the value of the fluid pressure in said one of said chambers.

References Cited by the Examiner

UNITED STATES PATENTS 2,382,457   8/1945   Wertman et al.  ------ 91—394
2,704,996   3/1955   Peterson et al.  -------- 91—394

FOREIGN PATENTS 213,677   2/1961   Austria.
779,280   7/1957   Great Britain.

SAMUEL LEVINE, *Primary Examiner.*

FRED E. ENGELTHALER, *Examiner.*